(12) United States Patent
Moriwaki et al.

(10) Patent No.: US 12,107,762 B2
(45) Date of Patent: Oct. 1, 2024

(54) OPTICAL AND ELECTRONIC INTEGRATED SWITCH

(71) Applicant: Nippon Telegraph and Telephone Corporation, Tokyo (JP)

(72) Inventors: Osamu Moriwaki, Musashino (JP); Shunichi Soma, Musashino (JP); Keita Yamaguchi, Musashino (JP); Kenya Suzuki, Musashino (JP); Seiki Kuwabara, Musashino (JP); Tetsuro Inui, Musashino (JP); Shuto Yamamoto, Musashino (JP); Seiji Okamoto, Musashino (JP); Hideki Nishizawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 250 days.

(21) Appl. No.: 17/794,526

(22) PCT Filed: Jan. 30, 2020

(86) PCT No.: PCT/JP2020/003473
§ 371 (c)(1),
(2) Date: Jul. 21, 2022

(87) PCT Pub. No.: WO2021/152783
PCT Pub. Date: Aug. 5, 2021

(65) Prior Publication Data
US 2023/0136142 A1 May 4, 2023

(51) Int. Cl.
*H04L 45/60* (2022.01)
*H04Q 11/00* (2006.01)

(52) U.S. Cl.
CPC ......... *H04L 45/60* (2013.01); *H04Q 11/0005* (2013.01); *H04Q 2011/0015* (2013.01);
(Continued)

(58) Field of Classification Search
None
See application file for complete search history.

(56) References Cited

U.S. PATENT DOCUMENTS 9,551,838 B2 * 1/2017 Jones ................... H04J 14/0212
10,284,291 B1 * 5/2019 Ryan ..................... H04B 10/29
(Continued)

OTHER PUBLICATIONS

K. Yamaguchi et al., "Route-and-Select Type Wavelength Cross Connect for Core-Shuffling of 7-Core MCFs with Spatial and Planar Optical Circuit," ECOC 2016; 42nd European Conference on Optical Communication, Dusseldorf, Germany, 2016, pp. 1-3. (Year: 2016).*

(Continued)

*Primary Examiner* — Rhonda S Peace
(74) *Attorney, Agent, or Firm* — Workman Nydegger

(57) ABSTRACT

A high-performance optical and electronic integrated switch capable of effectively extending the transmission distance includes a network processor that controls the functions of the packet switch, a plurality of optical transceivers provided near the processor and having a photoelectric conversion function, and an optical relay switch. A plurality of optical waveguides are connected to the input and output sides of the optical relay switch. Each optical transceiver has a regeneration function that performs optical-electrical conversion on inputted optical signals, then turns back the converted signals, and performs signal conversion on them, and its input side is connected with a routing optical waveguide included in the optical waveguides on the output side of the switch and its output side is connected with a routing optical waveguide included in the optical waveguides on the input side of the switch. The optical waveguides include ones for connecting to an external communication counterpart.

6 Claims, 4 Drawing Sheets

(52) U.S. Cl.
CPC .............. *H04Q 2011/0022* (2013.01); *H04Q 2011/0041* (2013.01)

(56) References Cited

U.S. PATENT DOCUMENTS

| | | | |
|---|---|---|---|
| 11,881,897 B2* | 1/2024 | Nishizawa | H04B 10/25759 |
| 11,930,309 B2* | 3/2024 | Yamaguchi | H04L 45/56 |
| 11,979,694 B2* | 5/2024 | Moriwaki | H04Q 11/0071 |
| 2023/0073384 A1* | 3/2023 | Moriwaki | H04Q 11/0071 |
| 2023/0136142 A1* | 5/2023 | Moriwaki | H04Q 11/0005 385/16 |

OTHER PUBLICATIONS

R. Hashimoto et al., "First Demonstration of Subsystem-Modular Optical Cross-Connect Using Single-Module 6×6 Wavelength-Selective Switch," in Journal of Lightwave Technology, vol. 36, No. 7, pp. 1435-1442, 1 Apr. 1, 2018. (Year: 2018).*

Coherent Working Group Participants, *Consortium for On-Board Optics The Use of On-Board Optic Compliant Modules in Coherent Applications*, Mar. 2019, pp. 1-39.

A Cobo White Paper, *Optical Connectivity Options for 400 Gbps and Higher On-Board Optics*, Mar. 2019, pp. 1-41.

Nathan Farrington et al., *Helios: A Hybrid Electrical/Optical Switch Architecture for Modular Data Centers*, 2010, pp. 1-12.

* cited by examiner

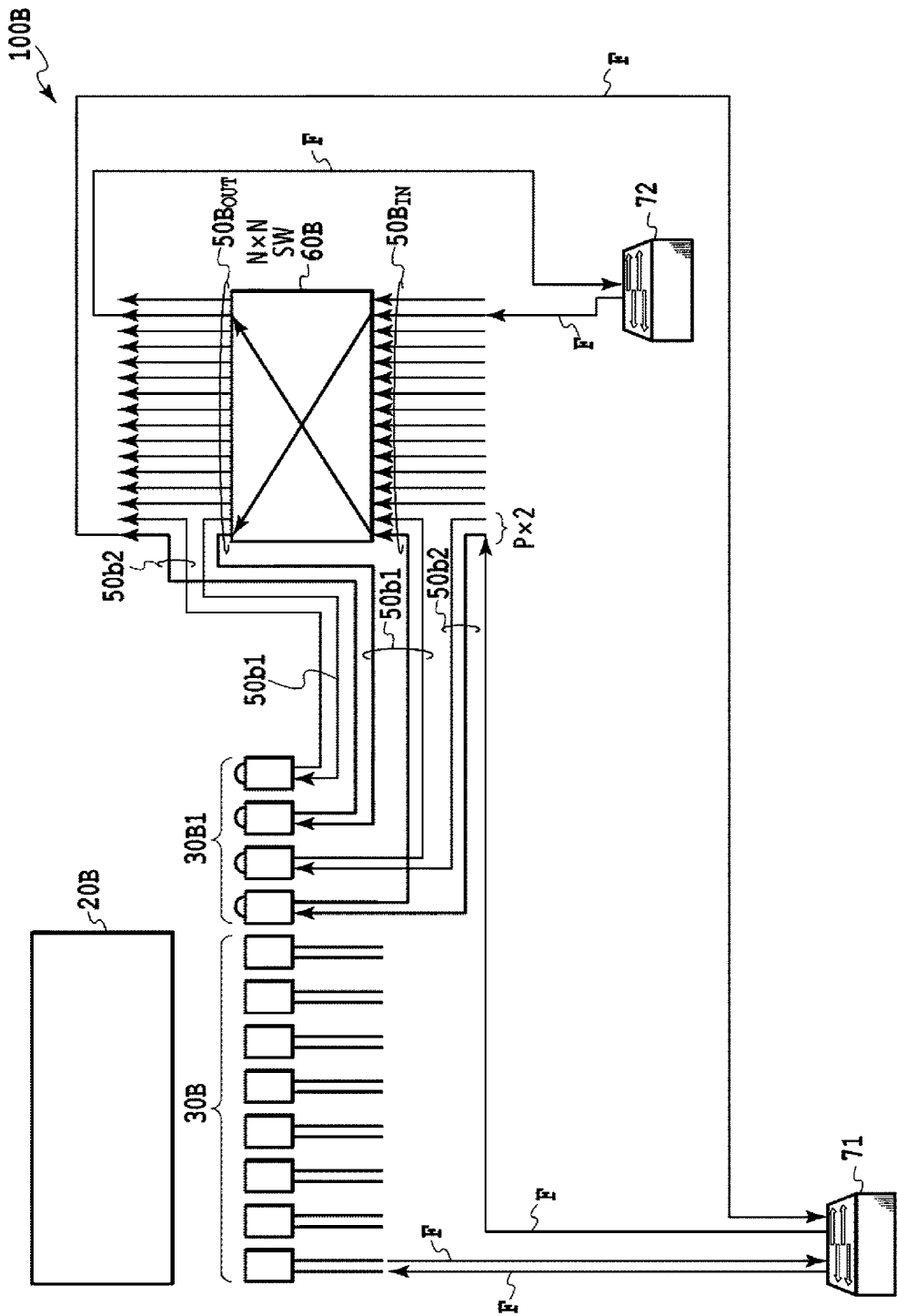

OPTICAL AND ELECTRONIC INTEGRATED SWITCH

TECHNICAL FIELD

The present invention relates to a high-performance optical and electronic integrated switch belonging to network switches.

BACKGROUND ART

In conventional techniques, electronic-circuit-based packet switches are often used for network switches used for the Internet. An example of an electronic circuit that controls this packet switch is a network processor, the capacity of which tends to increase year by year. The capacity of this network processor is determined by the value obtained by multiplying the signal speed by the number of ports. However, the increase in the capacity of the network processor increases the number of signals inputted to and outputted from the network processor, requiring an increase of the number of wiring lines (which may be called electrical wiring) through which electrical signals used for the input and output pass or an increase of the signal speed.

The higher the signal speed of the signals propagating through electrical wiring, the shorter the propagable distance of the signals, while the density of electrical wiring cannot be increased beyond the physical upper limit. For this reason, a further increase in the capacity of the network processor makes it difficult even to propagate electrical signals to the distance within the board or so. Under these circumstances, it is being studied to convert electrical signals into optical signals within the propagable distance and use optical wiring which is capable of long-distance transmission compared to electrical signals. Note that techniques related to the above description are disclosed in non-patent literature 1 and non-patent literature 2.

Techniques embodying the above study points are also being proposed. For example, non-patent literature 1 discloses an optical transceiver used for such applications that electronic circuits such as a network processor and optical transceivers having photoelectric conversion functions are provided side by side on a substrate and that these electronic circuits and optical transceivers are connected to one another with metal wiring or the like formed of an electrical conductor.

FIG. 1 is a top view diagram illustrating a schematic configuration for the case in which a technique disclosed in non-patent literature 1 is applied to a network switch 10. With reference to FIG. 1, this network switch 10 includes, on the upper surface of a substrate 1, a network processor 2 and a optical transceiver 3 having a photoelectric conversion function, and these devices are connected to one another with metal wiring 4. The network processor 2 is an electronic circuit that provides core functions of the packet switch, and is typically configured as an application specific integrated circuit (ASIC) in many cases. The optical transceiver 3 is a small component including an optical receiver (RX) 3a configured inside as a module, a laser (LASER) 3b, an electrical-processing function unit 3c, and an optical transmitter (TX) 3d, and also includes a connector 3e, optical fibers 3f, and the like. This optical transceiver 3 enables a plurality of optical transceivers 3 to be arranged side by side on the substrate 1 and thereby achieve high-density packaging like tiles.

As for the optical transceiver 3, the optical receiver 3a, in the case of coherent detection, plays roles of selectively enhancing the optical signals having wavelengths close to that of the laser 3b out of the optical signals inputted from the connected optical fiber 3f and converting the enhanced optical signals into electrical signals by optical-electrical conversion. The electrical-processing function unit 3c plays roles of performing electrical-signal digital signal processing at the time when signals are sent to or received from the network processor 2 and amplifying electrical signals at the time of transmission and reception of optical signals. The optical transmitter 3d plays roles of performing electrical-optical conversion by modulating the light inputted from the laser 3b using electrical signals inputted from the electrical-processing function unit 3c, and outputting the resultant signals to the connected optical fiber 3f. The connector 3e is provided for the connection with the network processor 2.

In general, the packet switching function provided by the network processor 2 is a highly functional one that can specify a destination for each packet but consumes a large amount of electric power per processing capacity. Meanwhile, the optical switch generally requires time for switching paths, and thus the applications of the optical switch are limited to the ones in which paths are fixed or the ones for switching in units of flows that continue for a long time. However, as for the optical switch, the power consumption required for switching is smaller than that of the packet switch, and it is not dependent on the signal speed and has an approximately constant value.

Nowadays, in order to reduce the electric power consumed by the network switch, techniques are being studied for reducing the switching capacity required for the packet switch by disposing the optical switch in parallel with the packet switch and transmitting long flows to the optical switch. Specifically, in these techniques, flows in which switching does not often occur are dealt with the optical switch, and thereby the switching capacity required for the packet switch is reduced. Related techniques are disclosed in Non-Patent Literature 3.

An example of such a optical switch is a waveguide optical switch fabricated using planar lightwave circuit (PLC) techniques.

However, a network switch having such a configuration will have a problem in communication if it is assumed that the communication counterpart is a signal source that is a node far from the network switch to the same degree as the transmission distance (for example, approximately 2 km) allowed by the optical transmission-reception function of the optical transceiver. Specifically, the packet switch in the network switch and a signal source can communicate with each other, but in the case in which signals are sent from a signal source to a signal source of another node via the optical switch, communication is impossible because it exceeds the upper limit of the transmission distance.

To avoid such a problem, the distances between the signal sources of all nodes and the packet switch need to be restricted such that they be shorter than approximately half the transmission distance allowed by the optical transmission-reception function of the optical transceiver, for example, within 1 km. This means that the transmission distance is restricted. Note that even if the distance between a signal source and the packet switch is longer than half the transmission distance allowed by the optical transmission-reception function, if it is only one node, communication is possible by restricting the distances between the signal sources of all the other nodes and the packet switch such that they be shorter than half the transmission distance allowed by the optical transmission-reception function.

CITATION LIST

Non-Patent Literature

Non-Patent Literature 1: "Consortium For On-Board Optics The Use of On-Board Optic Compliant Modules in Coherent Applications", COBO Release 1.0 Whitepaper (http://onboardoptics.org/wp-content/uploads/2019/05/COBO-CohOBO-AppNote-March-2018.pdf)

Non-Patent Literature 2: "Optical Connectivity Optaions for 400 Gbps and Higher On-Board Optics", COBO Connectivity Whitepaper, Revision 1.0 (http://onboardoptics.org/wp-content/uploads/2019/03/COBO-Optical-Connectivity-Whitepaper-March-2019.pdf)

Non-Patent Literature 3: "Helios: A Hybrid Electrical/Optical Switch Architecture for Modular Data Centers", Nathan Farrington, George Porter, Sivasankar Radhakrishnan, Hamid Hajabdolali Bazzaz, Vikram Subramanya, Yeshaiahu Fainman, George Papen, and Amin Vahdat [In: Proceedings of the ACM SIGCOMM 2010 Conference on SIG-COMM (SIGCOMM '10), pp. 339-350 (2010): University of California, San Diego]

SUMMARY OF THE INVENTION

The present invention has been made to solve the foregoing problem. An object of the embodiments according to the present invention is to provide a high-performance optical and electronic integrated switch in which a packet switch and a optical switch are integrated so that the transmission distance can be extended effectively.

An aspect of the present invention to achieve the above object is a optical and electronic integrated switch including a packet switch and an optical switch, in which the packet switch includes an electronic circuit and a plurality of optical transceivers provided near the electronic circuit and having a photoelectric conversion function, paths connecting between the electronic circuit and the plurality of optical transceivers are formed of wiring through which an electrical signal passes, a plurality of optical waveguides are connected to an input side and an output side of the optical switch, part of the plurality of optical transceivers have a regeneration function that, using the photoelectric conversion function, converts an inputted optical signal into an electrical signal by signal conversion, turns back the electrical signal and converts the electrical signal into an optical signal by signal conversion, and outputs the optical signal, and the part of the plurality of optical transceivers have optical waveguides that are configured such that at least part of the input sides of the part of the plurality of optical transceivers are connected to part of the plurality of optical waveguides on the output side of the optical switch, and that at least part of the output sides of the part of the plurality of optical transceivers are connected to part of the plurality of optical waveguides on the input side of the optical switch, and optical waveguides are used for paths for connecting, to input and output ports of the optical and electronic integrated switch, the input and output of the optical transceivers not having the regeneration function, the input and output of the optical transceivers having the regeneration function but not connected to the optical waveguides, and the plurality of optical waveguides for the optical switch, not connected to the optical waveguides In the optical and electronic integrated switch with the above configuration, part of the optical transceivers near the electronic circuit have a regeneration relay function that, using the photoelectric conversion function, converts inputted optical signals into electrical signals by optical-electrical conversion, turns back the electrical signal and converts them into optical signals by electrical-optical conversion, and outputs the optical signals. The optical transceivers having the regeneration relay function are connected to routing optical waveguides that are connected to the optical waveguides connected to the optical switch and route optical signals in cooperation with the optical waveguides of the optical switch. This makes it possible for the optical transceivers having the regeneration relay function to perform optical communication with external signal sources via the routing optical waveguides and the optical switch. As a result, it is possible to integrate the packet switch and the optical switch to extend the transmission distance effectively, making it possible to widen the operational range of the optical network that uses the optical and electronic integrated switch as a network switch.

BRIEF DESCRIPTION OF DRAWINGS

FIG. 4 is a top view diagram illustrating a schematic configuration of a optical and electronic integrated switch according to Embodiment 2 of the present invention.

DESCRIPTION OF EMBODIMENTS

Hereinafter, optical and electronic integrated switch according to several embodiments of the present invention will be described in detail with reference to the drawings.

Figure 2:
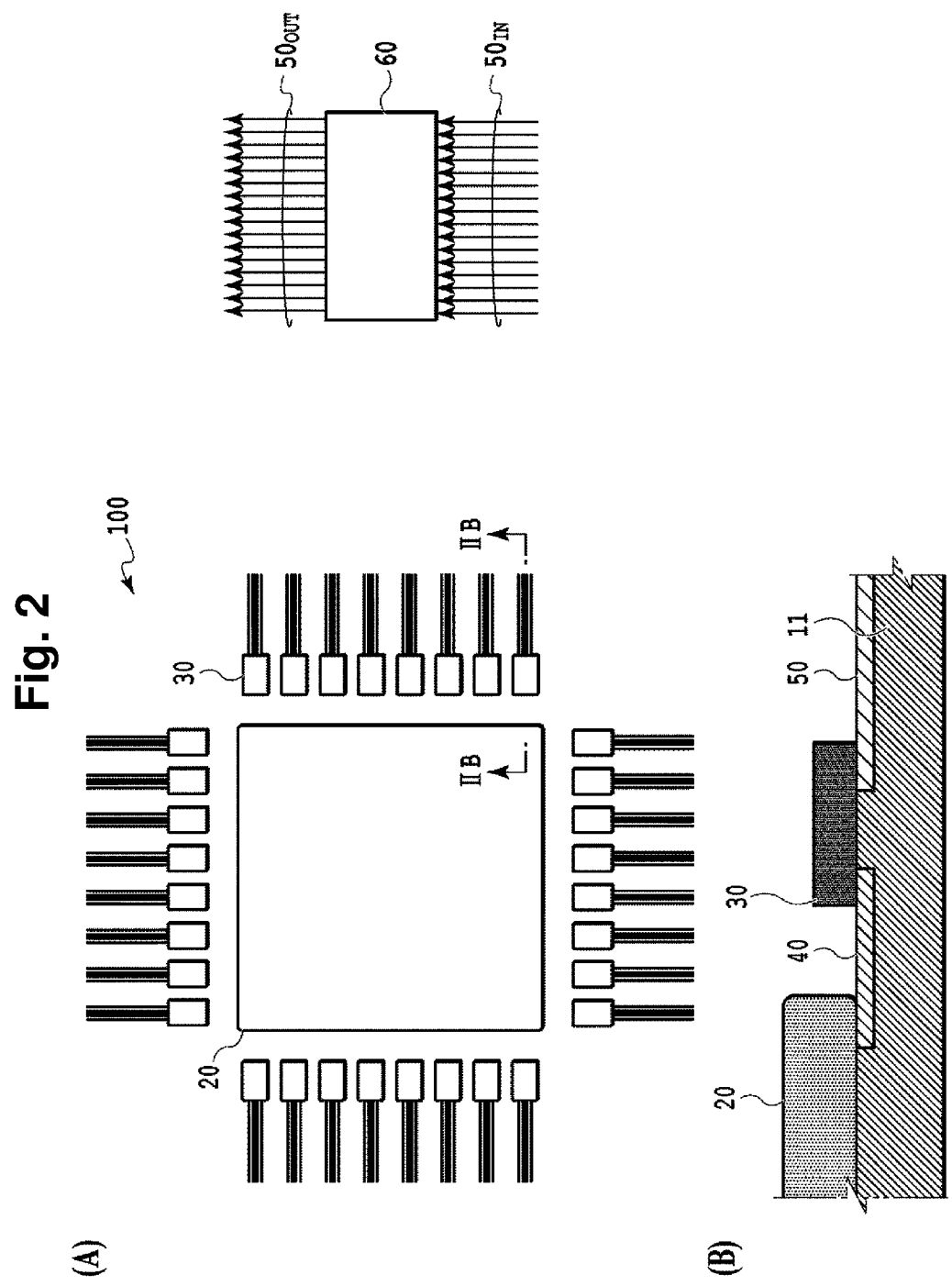
FIG. 2 is a diagram illustrating a schematic configuration of a optical and electronic integrated switch according to a preferred embodiment of the present invention. Part (A) is a plan view from the upper surface direction. Part (B) is a side cross-sectional view from the arrow IIB direction of a portion of part (A) in a state in which the portion is implemented on an interposer with optical waveguides.

First, a technical overview of the optical and electronic integrated switch according to a preferred embodiment of the present invention will be briefly described with reference to FIG. 2. FIG. 2 is a diagram illustrating a schematic configuration of a optical and electronic integrated switch 100 according to the preferred embodiment of the present invention. FIG. 2(A) is a plan view of the optical and electronic integrated switch 100 from the upper surface direction. FIG. 2(B) is a side cross-sectional view from the arrow IIB direction of a portion of FIG. 2(A) in a state in which the optical and electronic integrated switch 100 is implemented on a substrate 11.

Figure 1:
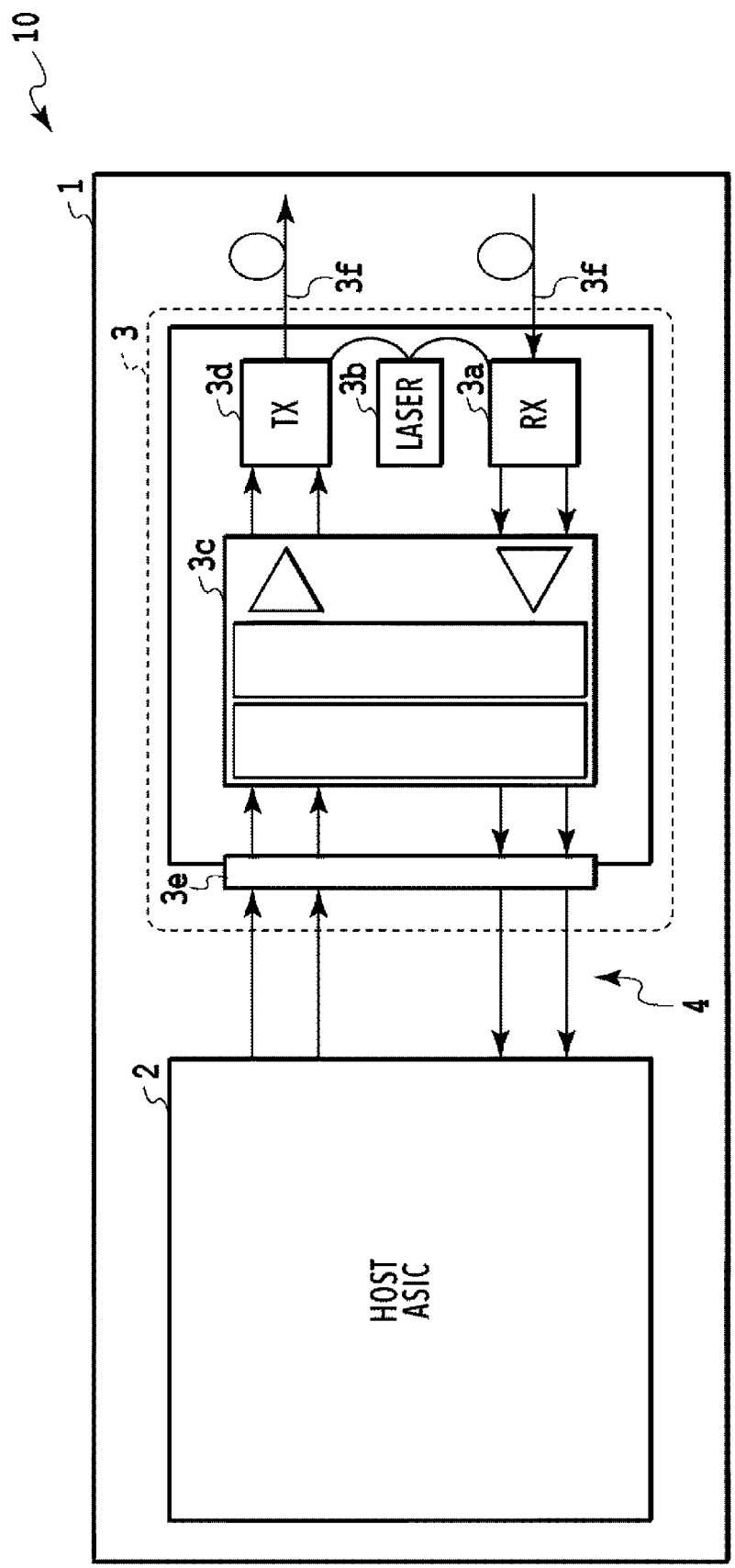
FIG. 1 is a top view diagram illustrating a schematic configuration of a network switch disclosed in Non-Patent Literature 1.

With reference to FIGS. 2(A) and 2(B), the optical and electronic integrated switch 100 includes a network processor 20 and a plurality of optical transceivers 30 having photoelectric conversion functions, the network processor 20 and the plurality of optical transceivers 30 composing a packet switch, and the optical and electronic integrated switch 100 also includes an optical relay switch 60. Of these, the network processor 20 is an electronic circuit that controls the functions of the packet switch and is capable of receiving and outputting a large number of high-speed signals. Each optical transceiver 30 is provided near the network processor 20 and has a configuration the same as or similar to the optical transceiver 3 described with reference to FIG. 1, but to simplify it, only its outer shape is illustrated. The optical relay switch 60 is an example of an optical switch and should preferably be a waveguide optical switch made by using PLC techniques.

In this optical and electronic integrated switch 100, metal wiring 40 through which electrical signals pass is used for the paths connecting between the network processor 20 and each optical transceiver 30. A plurality of optical waveguides 50 are connected to the input and output sides of the optical relay switch 60. For the paths connecting between the optical transceivers 30 and the optical relay switch 60, not only can the optical waveguides 50 be used, but also optical transmission members such as optical fibers can be used. Note that routing of the traces of the optical waveguides 50 is actually complicated. Thus, in FIG. 2(A), only the portions of optical waveguides $50_{IN}$ on the input side and optical waveguides $50_{OUT}$ on the output side related to the optical relay switch 60 are illustrated, and most of them are omitted. Part of the optical transceivers 30 have a regeneration relay function that, using the photoelectric conversion function, converts inputted optical signals into electrical signals by optical-electrical conversion, turns back the electrical signals and converts them into optical signals by electrical-optical conversion, and outputs the optical signals.

At least part of the input sides of the optical transceivers 30 having the regeneration relay function are connected to part of the optical waveguides $50_{OUT}$ on the output side of the optical waveguides 50 of the optical relay switch 60. Then, at least part of the output sides of the optical transceivers 30 having the regeneration relay function are connected to part of the optical waveguides $50_{IN}$ on the input side of the optical waveguides 50 for the optical relay switch 60. The optical transceivers 30 have routing optical waveguides configured (routed) as above. Optical waveguides can be used for the paths for connecting between the input-output ports of the optical and electronic integrated switch 100 and the input and output of the optical transceivers 30 not having the regeneration relay function, the input and output of the optical transceivers 30 having the regeneration relay function but not connected to the routing optical waveguides, and the optical waveguides $50_{IN}$ and $50_{OUT}$ of the optical relay switch 60, not connected to the routing optical waveguides. For example, optical fibers F or the like can be used for them.

In the optical and electronic integrated switch 100 described above, the network processor 20, the optical transceivers 30, the optical relay switch 60, the metal wiring 40, and the optical waveguides (or optical fibers F) 50 are implemented on the upper surface of one and the same substrate 11. The metal wiring 40 and the optical waveguides 50 compose an interposer with optical waveguides. In this implemented state, the network processor 20, the optical transceivers 30, and the optical relay switch 60 should preferably be arranged in one and the same plane of the upper surface of the interposer with optical waveguides. Note that the optical relay switch may be integrated as part of the optical waveguides 50 in the interposer with optical waveguides. In addition, in the area of the optical waveguides 50 of each optical switch, optical function devices are provided as necessary. Examples of the optical function devices include, in addition to optical switches for various applications, optical splitters and arrayed waveguide gratings (AWG).

Regarding the optical and electronic integrated switch 100 having the configuration outlined as above, a description will be given of embodiments for integrating the packet switch and the optical switch to extend the transmission distance effectively.

Embodiment 1

Figure 3:
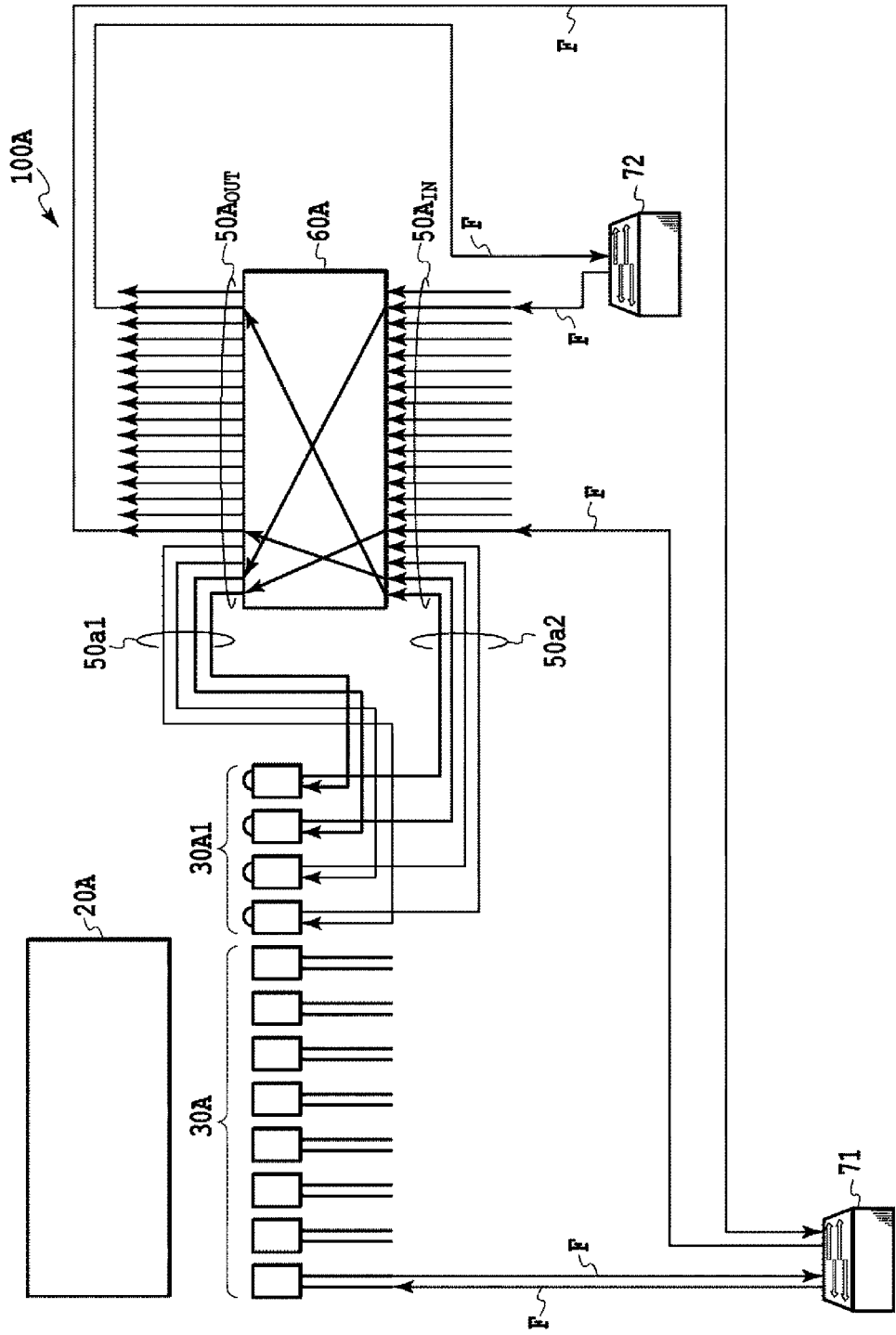
FIG. 3 is a top view diagram illustrating a schematic configuration of a optical and electronic integrated switch according to Embodiment 1 of the present invention.

FIG. 3 is a top view diagram illustrating a schematic configuration of a optical and electronic integrated switch 100A according to Embodiment 1 of the present invention.

With reference to FIG. 3, the optical and electronic integrated switch 100A includes a network processor 20A which is an electronic circuit configured to control the functions of the packet switch, a plurality of optical transceivers 30A and 30A1 having a photoelectric conversion function, and an optical relay switch 60A. The network processor 20A and the optical transceivers 30A and 30A1 compose the packet switch. Wiring through which electrical signals pass, such as metal wiring, is used for the paths connecting between the network processor 20A and the optical transceivers 30A. Defining the plurality as N (where N is a natural number of two or more), the optical relay switch 60A, which is an optical switch, is of an N×N type (N inputs and N outputs). The N×N type means that it has N inputs and N outputs, and the same is true of the following description. The optical relay switch 60A has an input side to which a plurality of optical waveguides $50A_{IN}$ are connected and an output side to which a plurality of optical waveguides $50A_{OUT}$ are connected. Each of optical transceivers 30A and 30A1 is provided near the network processor 20A, and each optical transceivers 30A1 has a regeneration relay function that, using the photoelectric conversion function, converts inputted optical signals into electrical signals by optical-electrical conversion, turns back the electrical signals and converts them into optical signals by electrical-optical conversion, and outputs the optical signals.

The optical transceivers 30A1 are an extended part to the optical transceivers 30A, and the input sides of the optical transceivers 30A1 are connected to routing optical waveguides 50a1 which are part of the optical waveguides $50A_{OUT}$ on the output side of the optical relay switch 60A. The output sides of the optical transceivers 30A1 are connected to routing optical waveguides 50a2 which are part of the optical waveguides $50A_{IN}$ on the input side of the optical relay switch 60A.

In the optical and electronic integrated switch 100A described above, optical fibers F can be used for the paths for connecting to the optical waveguides $50A_{IN}$ and $50A_{OUT}$ connected to the optical relay switch 60A, except the routing optical waveguides 50a1 and 50a2.

In this optical and electronic integrated switch 100A, four optical transceivers 30A1 having the regeneration relay function are an extended part to the optical transceivers 30A not having the regeneration relay function. Then, the paths connecting between the output sides of the optical transceivers 30A1 and part of the optical waveguides $50A_{IN}$ (for four extension ports) on the input side of the optical relay switch 60A are the routing optical waveguides 50a2. The paths connecting between the input sides of the optical transceivers 30A1 and part of the optical waveguides $50A_{OUT}$ (for four extension ports) on the output side of the optical relay switch 60A are the routing optical waveguides 50a1. Note that the optical transceivers 30A1 described here have the regeneration relay function that, using the photoelectric conversion function, converts inputted optical signals into electrical signals by optical-electrical conversion, turns back the electrical signals and converts them into optical signals by electrical-optical conversion, and outputs the optical signals.

The following description is based on the assumption that the optical and electronic integrated switch 100A having the configuration described above is used to perform optical communication between a signal source 71 which is a long-distance communication-counterpart node and a signal source 72 which is a short-distance communication-counterpart node. In this case, optical fibers F are connected between the long-distance signal source 71 and an optical transceiver 30A. Optical fibers F are also connected between the long-distance signal source 71 and optical waveguides $50A_{IN}$ and $50A_{OUT}$ of the optical relay switch 60A at locations not being the routing optical waveguides 50a1 and 50a2. Further, in this system configuration, optical fibers F are connected between the short-distance signal source 72 and optical waveguides $50A_{IN}$ and $50A_{OUT}$ of the optical relay switch 60A at locations not being the routing optical waveguides 50a1 and 50a2.

Specifically, optical fibers F for transmitting and receiving optical signals are connected between the signal source 71 and an optical transceiver 30A. Optical fibers F are also connected between the signal source 71 and one of the optical waveguides $50A_{IN}$ on the input side and one of the optical waveguides $50A_{OUT}$ on the output side of the optical relay switch 60A, the ones at specified locations not connected to the routing optical waveguides 50a1 and 50a2. In addition, optical fibers F are connected between the signal source 72 and one of the optical waveguides $50A_{IN}$ on the input side and one of the optical waveguides $50A_{OUT}$ on the output side of the optical relay switch 60A, the ones at different specified locations not connected to the routing optical waveguides 50a1 and 50a2.

In the above system configuration, optical signals are transmitted from the signal source 71 to the optical transceiver 30A through an optical fiber F. The optical transceiver 30A converts the transmitted optical signals into electrical signals by optical-electrical conversion and transmits the electrical signals to the network processor 20A through wiring that electrical signals pass through. The electrical signals outputted from the network processor 20A are inputted to the optical transceiver 30A through wiring that electrical signals pass through. The optical transceiver 30A converts the electrical signals into optical signals by electrical-optical conversion and transmits the optical signals to the long-distance signal source 71 through an optical fiber F.

In addition, in the above system configuration, optical signals are inputted from the signal source 71 to the optical relay switch 60A through the optical fiber F connected to one of the optical waveguides $50A_{IN}$ on the input side, the one at a specified location (for example, the fifth location from the left end) not connected to a routing optical waveguide 50a2. At the optical relay switch 60A, the optical signals inputted from the signal source 71 pass through one of the optical waveguides $50A_{OUT}$ on the output side, the one at a specified location (for example, the location at the left end) connected to a routing optical waveguide 50a1, then through the routing optical waveguide 50a1, and transmitted to an optical transceiver 30A1. The optical transceiver 30A1 converts the inputted optical signals into electrical signals by optical-electrical conversion, then turns back the electrical signals and converts them into optical signals by electrical-optical conversion, and transmits the optical signals via a routing optical waveguide 50a2 to one of the optical waveguides $50A_{IN}$ on the input side of the optical relay switch 60A, the one at a specified location (for example, the location at the left end) connected to the routing optical waveguide 50a1. At the optical relay switch 60A, the optical signals turned back from the optical transceiver 30A1 pass through the optical fiber F connected to one of the optical waveguides $50A_{OUT}$ on the output side, the one at a different specified location (for example, the second location from the right end) not connected to a routing optical waveguide 50a1, and transmitted to the signal source 72.

Note that the signal source 71 uses optical fibers F for connecting to the optical transceiver 30A. The signal source 71 also uses optical fibers F for connecting to the optical waveguides $50A_{IN}$ and $50A_{OUT}$ of the optical relay switch 60A on the input and output sides, not connected to routing optical waveguides 50a1 and 50a2. Here, the number of paths to the network processor 20A via the optical transceivers 30A does not have to be the same as the number of paths to the optical relay switch 60A. Optical fibers F are used to connect the paths described above.

Further, in the above system configuration, optical signals are inputted from the signal source 72 to the optical relay switch 60A through the optical fiber F connected to one of the optical waveguides $50A_{IN}$ on the input side, the one at a different specified location (for example, the second location from the right end) not connected to a routing optical waveguides 50a2. At the optical relay switch 60A, the optical signals inputted from the signal source 72 pass through one of the optical waveguides $50A_{OUT}$ on the output side, the one at a different specified location (for example, the second location from the left end) connected to a routing optical waveguide 50a1, then through the routing optical waveguide 50a1, and is transmitted to an optical transceiver 30A1 having the regeneration relay function at a different specified location (for example, the second location from the right end). The optical transceiver 30A1 converts the inputted optical signals into electrical signals by optical-electrical conversion, then turns back the electrical signals and converts them into optical signals by electrical-optical conversion, and transmits the optical signals to the optical relay switch 60A via a routing optical waveguide 50a2 and one of the optical waveguides $50A_{IN}$ on the input side of the optical relay switch 60A, the one at a different specified location (for example, the second location from the left end) connected to the routing optical waveguide 50a2. At the optical relay switch 60A, the optical signals are transmitted to the signal source 71 through the optical fiber F connected to one of the optical waveguides $50A_{OUT}$ on the output side, the one at a specified location (for example, the fifth location from the left end) not connected to a routing optical waveguide 50a1.

In other words, in the above system configuration, the optical signals that the signal source 71 transmits and receives are regenerated and relayed by the optical transceiver 30A1. As has been described with reference to FIG. 3, the optical communication by the transmission and reception of the signal source 71 requires two optical transceivers 30A1 having the regeneration relay function for one node.

In the optical and electronic integrated switch 100A of Embodiment 1, of the optical transceivers 30A and 30A1 provided near the network processor 20A, the optical transceivers 30A1 have the regeneration relay function that converts inputted optical signals into electrical signals by optical-electrical conversion, turns back the electrical signals and converts them into optical signals by electrical-optical conversion, and outputs the optical signals. In addition, the paths connecting to the optical transceivers 30A1 are formed of the routing optical waveguides 50a1 and 50a2.

Further, in the optical and electronic integrated switch 100A, part of the optical waveguides $50A_{IN}$ on the input side and part of the optical waveguides $50A_{OUT}$ on the output side of the optical relay switch 60A, the parts not connected to the routing optical waveguides 50a1 and 50a2, are selected, and those parts can be connected to external communication counterparts.

With the system configuration as described above, an optical transceiver 30A1 receives optical signals from an external signal source 71 or 72 and transmits the optical signals to the other external signal source, so that optical communication can be performed between the two external signal sources 71 and 72. Thus, the system configuration makes it possible to integrate the packet switch and the optical switch to extend the transmission distance effectively, making it possible to widen the operational range of the optical network that uses the optical and electronic integrated switch 100A as a network switch. Note that the communication counterpart of the signal source 71 may be another long-distance signal source.

Embodiment 2

FIG. 4 is a top view diagram illustrating a schematic configuration of a optical and electronic integrated switch 100B according to Embodiment 2 of the present invention.

With reference to FIG. 4, the optical and electronic integrated switch 100B includes a network processor 20B which is an electronic circuit configured to control the functions of the packet switch, a plurality of optical transceivers 30B and 30B1 having a photoelectric conversion function, and an optical relay switch 60B. The network processor 20B and the optical transceivers 30B and 30B1 compose the packet switch. Wiring through which electrical signals pass, such as metal wiring, is used for the paths connecting between the network processor 20B and the optical transceivers 30B. The optical relay switch 60B, which is an optical switch, is also of an N×N type, and the optical relay switch 60B has an input side to which a plurality of optical waveguides $50B_{IN}$ are connected and an output side to which a plurality of optical waveguides $50B_{OUT}$ are connected. The optical transceivers 30B and 30B1 are provided near the network processor 20B, and each optical transceiver 30B1 has a regeneration relay function that converts inputted optical signals into electrical signals by optical-electrical conversion, turns back the electrical signals and converts them into optical signals by electrical-optical conversion, and outputs the optical signals.

The optical transceivers 30B1 are an extended part to the optical transceivers 30B, and the input sides of the optical transceivers 30B1 at specified locations and the output sides of the optical transceivers 30B1 at different specified locations are provided with outgoing optical waveguides 50b2 for connecting to input-output ports of the optical and electronic integrated switch 100B, separately from the optical waveguides $50B_{IN}$ and $50B_{OUT}$ on the input and output sides of the optical relay switch 60B. Here, also for the optical waveguides $50B_{IN}$ and $50B_{OUT}$, routing optical waveguides 50b1 are used for the connection between the output sides of the optical transceivers 30B1 at specified locations and part of the optical waveguides $50B_{IN}$ on the input side of the optical relay switch 60B. The routing optical waveguides 50b1 are also used for the connection between part of the optical waveguides $50B_{OUT}$ on the output side of the optical relay switch 60B and the input sides of the optical transceivers 30B1 at different specified locations. In other words, as for the optical transceivers 30B1, the input sides at specified locations different from the locations connected to the routing optical waveguides 50b1 and the output sides at specified locations different from the locations connected to the routing optical waveguides 50b1 are provided with the outgoing optical waveguides 50b2 for connecting to the input-output ports of the optical and electronic integrated switch 100B.

In other words, in the optical and electronic integrated switch 100B, the outgoing optical waveguides 50b2 on the input sides of the optical transceivers 30B at specified locations are used for direct input connection with long-distance communication counterparts. In addition, the outgoing optical waveguides 50b2 on the output sides of the optical transceivers 30B at the different specified locations are used for direct output connection with the long-distance communication counterparts. These outgoing optical waveguides 50b2 for input connection are indicated by P×2 in FIG. 4, which means input for two ports.

Also in this optical and electronic integrated switch 100B, four optical transceivers 30B1 having the regeneration relay function are an extended part to the optical transceivers 30B not having the regeneration relay function. Note that the optical transceivers 30B1 here also have the regeneration relay function that, using the photoelectric conversion function, regenerates inputted optical signals by converting the inputted optical signals into electrical signals by optical-electrical conversion, and converting the electrical signal into optical signals by electrical-optical conversion. Then, part of the optical waveguides $50B_{IN}$ on the input side (the two ports from the left end) of the optical relay switch 60B are connected through the routing optical waveguides 50b1 to the output sides of the optical transceivers 30B1 at specified locations (the two pieces on the left side in FIG. 4). In addition, part of the optical waveguides $50B_{OUT}$ on the output side (the two ports from the left end) of the optical relay switch 60B are connected through the routing optical waveguides 50b1 to the input sides of the optical transceivers 30B1 at different specified locations (the two pieces on the right side in FIG. 4).

The following description is based on the assumption that the optical and electronic integrated switch 100B having the configuration described above is used to perform optical communication between a signal source 71 which is a long-distance communication-counterpart node and a signal source 72 which is a short-distance communication-counterpart node. In this case, optical fibers F are connected between the signal source 71 and an optical transceiver 30B. Optical fibers F are also connected between the signal source 71 and the outgoing optical waveguide 50b2 on the input side of the optical transceiver 30B1 at a specified location and between the signal source 71 and the outgoing optical waveguide 50b2 on the output side of the optical transceiver 30B1 at a different specified location. Further, in this system configuration, optical fibers F are connected between the signal source 72 and optical waveguides $50A_{IN}$ and $50A_{OUT}$ of the optical relay switch 60B at locations not connected to the routing optical waveguides 50a1 and 50a2.

Specifically, optical fibers F for transmitting and receiving optical signals are connected from the signal source 71 to an optical transceiver 30B. In addition, the signal source 71 is connected to the outgoing optical waveguide 50b2 on the input side of the optical transceiver 30B1 at a specified location, by using an optical fiber F. Then, the signal source 71 is connected to the outgoing optical waveguide 50b2 on the output side of the optical transceiver 30B1 at a different specified location by using an optical fiber F. Further, optical fibers F are connected between the signal source 72 and the optical waveguides $50B_{IN}$ and $50B_{OUT}$ of the optical relay switch 60B at locations not connected to the routing optical waveguides 50b1 and 50b2.

In the above system configuration, optical signals are transmitted from the signal source 71 to the optical transceiver 30B through an optical fiber F. The optical transceiver 30B converts transmitted optical signals into electrical signals by optical-electrical conversion and transmits the electrical signals to the network processor 20B through electrical wiring. The electrical signals outputted from the network processor 20B are inputted to the optical transceiver 30B through wiring that electrical signals pass through. The optical transceiver 30B converts the electrical signals into optical signals by electrical-optical conversion and sends out the optical signals to the long-distance signal source 71 through an optical fiber F.

In addition, in the above system configuration, optical signals are transmitted from the signal source 71 through the optical fiber F connected to the outgoing optical waveguide 50b2 (indicated by a thick line) on the input side of the optical transceiver 30B1 at a specified location (for example, the location at the left end). The optical transceiver 30B1 converts the inputted optical signals into electrical signals by optical-electrical conversion, then turns back the electrical signals and converts them into optical signals by electrical-optical conversion, and transmits the optical signals via a routing optical waveguide 50b1 to one of the optical waveguides $50B_{IN}$ on the input side of the optical relay switch 60B, the one at a specified location (for example, the location at the left end) connected to the routing optical waveguide 50b1. At the optical relay switch 60B, the optical signals turned back from the optical transceiver 30B1 pass through the optical fiber F connected to one of the optical waveguides $50B_{OUT}$ on the output side, the one at a different specified location not connected to a routing optical waveguide 50b1, and are transmitted to the signal source 72. Note that the different specified location is, for example, the second location from the right end.

Also in this optical and electronic integrated switch 100B, the number of paths to the network processor 20B via the optical transceivers 30B does not have to be the same as the number of the paths to the optical relay switch 60B.

Further, in the above system configuration, optical signals are inputted from the signal source 72 through the optical fiber F connected to one of the optical waveguides $50B_{IN}$ on the input side of the optical relay switch 60B, the one at a different specified location not connected to a routing optical waveguide 50b1. Note that the different specified location is, for example, the second location from the right end. At the optical relay switch 60B, the inputted optical signals pass through one of the optical waveguides $50B_{OUT}$ on the output side, the one at a specified location (for example, the location at the left end) for a routing optical waveguide 50b1, and through the routing optical waveguide 50b1, and are transmitted to the optical transceiver 30B at a different specified location. Note that the different specified location is, for example, the second location from the right end. The optical transceiver 30B converts the inputted optical signals into electrical signals by optical-electrical conversion, then turns back the electrical signals and converts them into optical signals by electrical-optical conversion, and transmits the optical signals to the signal source 71 through the optical fiber F connected to an outgoing optical waveguide 50b2 on the output side.

In other words, in the above system configuration, the optical signals that the signal source 71 transmits and receives are regenerated and relayed by the optical transceiver 30B1. As has been described with reference to FIG. 4, also here, the optical communication by transmission and reception of the signal source 71 requires two optical transceivers 30B1 having the regeneration relay function for one node.

In the optical and electronic integrated switch 100B of Embodiment 2, of the optical transceivers 30B and 30B1 provided near the network processor 20B, the optical transceivers 30B1 have the regeneration relay function that converts inputted optical signals into electrical signals by optical-electrical conversion, turns back the electrical signals and converts them into optical signals by electrical-optical conversion, and outputs the optical signals. The paths connecting between the optical transceivers 30B1 and the optical relay switch 60B are formed of the routing optical waveguides 50b1. Further, external communication counterparts can be connected to the outgoing optical waveguides 50b2 led from the input sides of the optical transceivers 30B1 at specified locations and the output sides of the optical transceivers 30B1 at different specified locations and can be connected to the input and output sides of the optical relay switch 60B not connected to the routing optical waveguides 50b1.

Also with the system configuration as described above, an optical transceiver 30B1 receives optical signals from an external signal source 71 or 72 and transmits the optical signals to the other external signal source, so that optical communication can be performed between the two external signal sources 71 and 72. Thus, as in the case of Embodiment 1, it is possible to integrate the packet switch and the optical switch to extend the transmission distance effectively, making it possible to widen the operational range of the optical network that uses the optical and electronic integrated switch 100B as a network switch.

The invention claimed is:

1. A optical and electronic integrated switch comprising a packet switch and an optical switch, wherein
the packet switch includes an electronic circuit and a plurality of optical transceivers provided near the electronic circuit and having a photoelectric conversion function,
paths connecting between the electronic circuit and the plurality of optical transceivers are formed of wiring through which an electrical signal passes,
a plurality of optical waveguides are connected to an input side and an output side of the optical switch,
part of the plurality of optical transceivers have a regeneration function that, using the photoelectric conversion function, converts an inputted optical signal into an electrical signal by signal conversion, turns back the electrical signal and converts the electrical signal into an optical signal by signal conversion, and outputs the optical signal, and the part of the plurality of optical transceivers have optical waveguides that are configured such that at least part of the input sides of the part of the plurality of optical transceivers are connected to part of the plurality of optical waveguides on the output side of the optical switch, and that at least part of the output sides of the part of the plurality of optical transceivers are connected to part of the plurality of optical waveguides on the input side of the optical switch, and
optical waveguides are used for paths for connecting, to input and output ports of the optical and electronic integrated switch, the input and output of the optical transceivers not having the regeneration function, the input and output of the optical transceivers having the regeneration function but not connected to the optical waveguides, and the plurality of optical waveguides for the optical switch, not connected to the optical waveguides.

2. The optical and electronic integrated switch according to claim 1, wherein the optical transceivers having the regeneration function are an extended part to the optical transceivers not having the regeneration function, the routing optical waveguides are formed such that the input sides of the optical transceivers having the regeneration function are connected to part of the plurality of optical waveguides on the output side of the optical switch, and that the output sides of the optical transceivers having the regeneration function are connected to part of the plurality of optical waveguides on the input side of the optical switch, and the optical switch receives input of an optical signal from a long-distance communication counterpart at one of the plurality of optical waveguides on the input side, the one at a specified location not connected to the routing optical waveguides, through the optical waveguide, passes the optical signal through one of the plurality of optical waveguides on the output side, the one at a specified location connected to one of the routing optical waveguides, and through the routing optical waveguide, transmits the optical signal to one of the optical transceivers having the regeneration function, passes the optical signal turned back from the optical transceiver having the regeneration function through one of the routing optical waveguides and one of the plurality of optical waveguides on the input side, the one at a specified location connected to the routing optical waveguide, connects the optical waveguide on the input side to one of the plurality of optical waveguides on the output side, the one at a different specified location not connected to the routing optical waveguides, and thereby transmits the turned-back optical signal through the optical waveguide to a different communication counterpart, and receives input of an optical signal from the different communication counterpart at one of the plurality of optical waveguides on the input side, the one at a different specified location not connected to the routing optical waveguides, through the optical waveguide, passes the optical signal through one of the plurality of optical waveguides on the output side, the one at a different specified location connected to one of the routing optical waveguides, and through the routing optical waveguide, transmits the optical signal to one of the optical transceivers having the regeneration function, passes the optical signal turned back from the optical transceiver having the regeneration function through one of the routing optical waveguides and one of the plurality of optical waveguides on the input side, the one at a different location connected to the routing optical waveguide, connects the optical waveguide on the input side to one of the plurality of optical waveguides on the output side, the one at a specified location not connected to the routing optical waveguide, and thereby transmits the turned-back optical signal through the optical waveguide to the long-distance communication counterpart.

3. The optical and electronic integrated switch according to claim 1, wherein the optical transceivers having the regeneration function are an extended part to the optical transceivers not having the regeneration function, separately from the plurality of optical waveguides on the input side and the output side of the optical switch, outgoing optical waveguides for connecting to input-output ports of the optical and electronic integrated switch are provided on the input side of one the optical transceivers having the regeneration function, the one at a specified location, and the output side of one of the optical transceivers having the regeneration relay-function, the one at a different specified location, the outgoing optical waveguide on the input side of the optical transceiver having the regeneration function at the specified location is for direct input connection with a long-distance communication counterpart, the outgoing optical waveguide on the output side of the optical transceiver having the regeneration function at the different specified location is for direct output connection with the long-distance communication counterpart, and the optical switch passes an optical signal that is inputted from the long-distance communication counterpart through the outgoing optical waveguide on the input side of the optical transceiver having the regeneration function at the specified location, transmitted to the optical transceiver having the regeneration function, and then turned back from the optical transceiver having the regeneration function, through one of the routing optical waveguides and one of the plurality of optical waveguides on the input side at a specified location, connects the optical waveguide on the input side to one of the plurality of optical waveguides on the output side, the one at a different specified location not connected to the routing optical waveguides, and thereby transmits the turned-back optical signal through the optical waveguide to a short-distance communication counterpart, and receives input of an optical signal from the short-distance communication counterpart at one of the plurality of optical waveguides on the input side, the one at a different specified location not connected to the routing optical waveguides, through the optical waveguide, passes the optical signal through one of the plurality of optical waveguides on the output side, the one at a specified location, and through one of the routing optical waveguides, transmits the optical signal to one of the optical transceivers having the regeneration function, the one at a different specified location, passes the optical signal turned back from the optical transceiver having the regeneration function through the outgoing waveguide on the output side of one of the optical transceivers having the regeneration function, the one at the different specified location, and thereby transmits the turned-back optical signal to the long-distance communication counterpart.

4. The optical and electronic integrated switch according to claim 1, wherein part of the optical waveguides are optical fibers.

5. The optical and electronic integrated switch according to claim 1, wherein the optical switch is a waveguide optical switch fabricated using a planar lightwave circuit (PLC) technique, the electronic circuit, the plurality of optical transceivers, the optical switch, the wiring, and the optical waveguides are implemented on an upper surface of one and the same substrate, the wiring and the optical waveguides compose an interposer with optical waveguides, and the electronic circuit, the plurality of optical transceivers, and the optical switch are arranged, in the implemented state, on one and the same plane of an upper surface of the interposer with optical waveguides.

6. The optical and electronic integrated switch according claim 5, wherein the optical switch is integrated as part of the optical waveguides in the interposer with optical waveguides.

* * * * *